US010679168B2

(12) United States Patent
Kakkad et al.

(10) Patent No.: US 10,679,168 B2
(45) Date of Patent: Jun. 9, 2020

(54) REAL-TIME METHOD AND SYSTEM FOR ASSESSING AND IMPROVING A PRESENCE AND PERCEPTION OF AN ENTITY

(71) Applicant: Accenture Global Solutions Limited, Dublin (IE)

(72) Inventors: Hemant Manaharlal Kakkad, Mumbai (IN); Pankhuri Jayprakash Koria, Mumbai (IN); Hardik Pradeep Shah, Thane (IN)

(73) Assignee: Accenture Global Solutions Limited, Dublin (IE)

( * ) Notice: Subject to any disclaimer, the term of this patent is extended or adjusted under 35 U.S.C. 154(b) by 310 days.

(21) Appl. No.: 15/457,647

(22) Filed: Mar. 13, 2017

(65) Prior Publication Data
US 2018/0137444 A1 May 17, 2018

(30) Foreign Application Priority Data
Nov. 14, 2016 (IN) .............................. 201641038779

(51) Int. Cl.
  *G06Q 10/00* (2012.01)
  *G06Q 10/06* (2012.01)
  *G06Q 50/00* (2012.01)
(52) U.S. Cl.
  CPC ......... *G06Q 10/0639* (2013.01); *G06Q 50/01* (2013.01)
(58) Field of Classification Search
  CPC .................................................... G06Q 50/01
  See application file for complete search history.

(56) References Cited

U.S. PATENT DOCUMENTS

| 8,484,041 B2 | 7/2013 | Yang | |
| 2010/0121849 A1* | 5/2010 | Goeldi | G06Q 10/00 707/736 |

(Continued)

OTHER PUBLICATIONS

D Duan, W Qian, S Pan, L Shi, and C Lin. VISA: a visual sentiment analysis system. In Proceedings of the 5th International Symposium on Visual Information Communication and Interaction, pp. 22-28. ACM, 2012. (Year: 2012).*

(Continued)

*Primary Examiner* — William S Brockington, III
*Assistant Examiner* — Scott M Ross
(74) *Attorney, Agent, or Firm* — Brinks Gilson & Lione

(57) ABSTRACT

A method for assessing and improving a presence and perception of an entity includes, for one or more presence categories of data sources, determining a number of data sources in a presence category on which the entity has a presence to thereby determine a presence score for the entity. The presence score increases as the number of data sources upon which the entity has a presence increases. For each of a plurality of comments posted on one or more social media sources, the method also includes determining a perception category and sentiment score associated with each comment that is related to the entity to thereby determine a perception score for the entity. A higher perception score indicates that, on average, users have a higher perception of the entity. The method also includes generating a recommendation for improving one or more of the presence score and perception score of the entity based on the determined presence score and the determined perception score.

20 Claims, 10 Drawing Sheets

(56) References Cited

U.S. PATENT DOCUMENTS

2012/0072572 A1    3/2012   Bladel
2012/0179692 A1*  7/2012   Hsiao ...................... G06F 16/34
                                                                         707/748
2014/0095598 A1*  4/2014   Schornack ........... G06Q 10/101
                                                                         709/204
2015/0100377 A1    4/2015   Penumaka et al.
2018/0300780 A1* 10/2018   Kaplan .............. G06Q 30/0601

OTHER PUBLICATIONS

Adam Marcus, Michael S. Bernstein, Osama Badar, David R. Karger, Samuel Madden, and Robert C. Miller. 2011. Twitinfo: aggregating and visualizing microblogs for event exploration. ACM, New York, NY, USA, 227-236. (Year: 2011).*

Gruhl, Daniel, Meena Nagarajan, Jan Pieper, Christine Robson & Amit Sheth 2010. Multimodal social intelligence in a real-time dashboard system. The VLDB Journal 19:6 (Year: 2010).*

Adam Marcus, Michael S. Bernstein, Osama Badar, David R. Karger, Samuel Madden, Robert C. Miller, Processing and Visualizing the Data in Tweets, SIGMOD Record, Dec. 2011 (vol. 40, No. 4) (Year: 2011).*

Examination Report No. 2 in Australian Application No. 2017232032, dated Aug. 24, 2018, pp. 1-4.

Australian Patent Office, Examination Report No. 1 for Australian Patent Application No. 2017232032 dated Apr. 13, 2018, pp. 1-5.

* cited by examiner

REAL-TIME METHOD AND SYSTEM FOR ASSESSING AND IMPROVING A PRESENCE AND PERCEPTION OF AN ENTITY

RELATED APPLICATIONS

This application claims the benefit of priority to Indian Patent Application No. 201641038779, filed Nov. 14, 2016, the contents of which are hereby incorporated by reference in their entirety.

BACKGROUND

Field

This application generally relates to methods for analyzing the performance of an entity. In particular, this application describes a real-time method and system for assessing and improving a presence and perception of an entity.

Description of Related Art

Knowledge of a company's public perception is critical to success of the company. For example, a company that is perceived to be inaccessible or which produces products perceived to be of low quality may find it challenging to increase market share even though the products produced are of an acceptable quality. On the other hand, a company producing products of similar quality, but perceived to be producing higher quality products, may have an easier time increasing market share. Thus, understanding how a company is perceived by a target consumer group is critical to the success of the company.

Unfortunately, it is difficult for a company to make this determination. In some cases, surveys may be sent to a statistically significant number of members of the public to gauge public perception of the company. However, the amount of information captured on such surveys is limited and, therefore, of limited value. In addition, the surveys may be sent out to the public on a sporadic basis and, therefore, provide a relatively course level of granularity with respect to public perception over time.

BRIEF SUMMARY

In one aspect, a method for assessing and improving a presence and perception of an entity includes, for one or more presence categories of data sources, determining a number of data sources in a presence category on which the entity has a presence to thereby determine a presence score for the entity. The presence score increases as the number of data sources upon which the entity has a presence increases. For each of a plurality of comments posted on one or more social media sources, the method also includes determining a perception category and sentiment score associated with each comment that is related to the entity to thereby determine a perception score for the entity. A higher perception score indicates that, on average, users have a higher perception of the entity. The method also includes locating, based on the determined presence score and the determined perception score, a recommendation record in a database, where the recommendation record defines instructions for improving one or more of the presence score and perception score of the entity, and communicating, via a user interface, the instructions to a user.

In a second aspect, a system for assessing and improving a presence and perception of an entity includes a processor and instruction code that is executable by the processor. The instruction code includes a presence analysis module, a perception analysis module, and a recommendation module. For one or more presence categories of data sources, the presence analysis module is configured to cause the processor to determine a number of data sources in a presence category on which the entity has a presence to thereby determine a presence score for the entity. The presence score increases as the number of data sources upon which the entity has a presence increases. For each of a plurality of comments posted on one or more social media sources, the perception analysis module is configured to cause the processor to determine a perception category and sentiment score associated with each comment that is related to the entity to thereby determine a perception score for the entity. A higher perception score indicates that, on average, users have a higher perception of the entity. The recommendation module is configured to cause the processor to locate, based on the determined presence score and the determined perception score, a recommendation record in a database, the recommendation record defining instructions for improving one or more of the presence score and perception score of the entity; and communicate, via a user interface, the instructions to a user.

In a third aspect, a non-transitory computer readable medium is provided that has instruction code stored thereon for assessing and improving a presence and perception of an entity. The instruction code is executable by a machine for causing the machine to perform acts comprising determining, for one or more presence categories of data sources, a number of data sources in a presence category on which the entity has a presence to thereby determine a presence score for the entity. The presence score increases as the number of data sources upon which the entity has a presence increases. The instruction code is further executable by the machine for causing the machine to determining, for each of a plurality of comments posted on one or more social media sources, a perception category and sentiment score associated with each comment that is related to the entity to thereby determine a perception score for the entity, wherein a higher perception score indicates that, on average, users have a higher perception of the entity; and generate a recommendation for improving one or more of the presence score and perception score of the entity based on the determined presence score and the determined perception score.

DETAILED DESCRIPTION

The embodiments described below overcome the problems discussed above by providing a method and system for assessing the presence and the perception of an entity, such as a company. Generally, the system performs various methods for searching a variety of data sources for information related to the entity. Natural language processing, and other artificial intelligence techniques are utilized to locate information related to the company on a given data source, and to determine the meaning of the information. The information is aggregated to assess an overall presence and perception of the entity.

Figure 1:
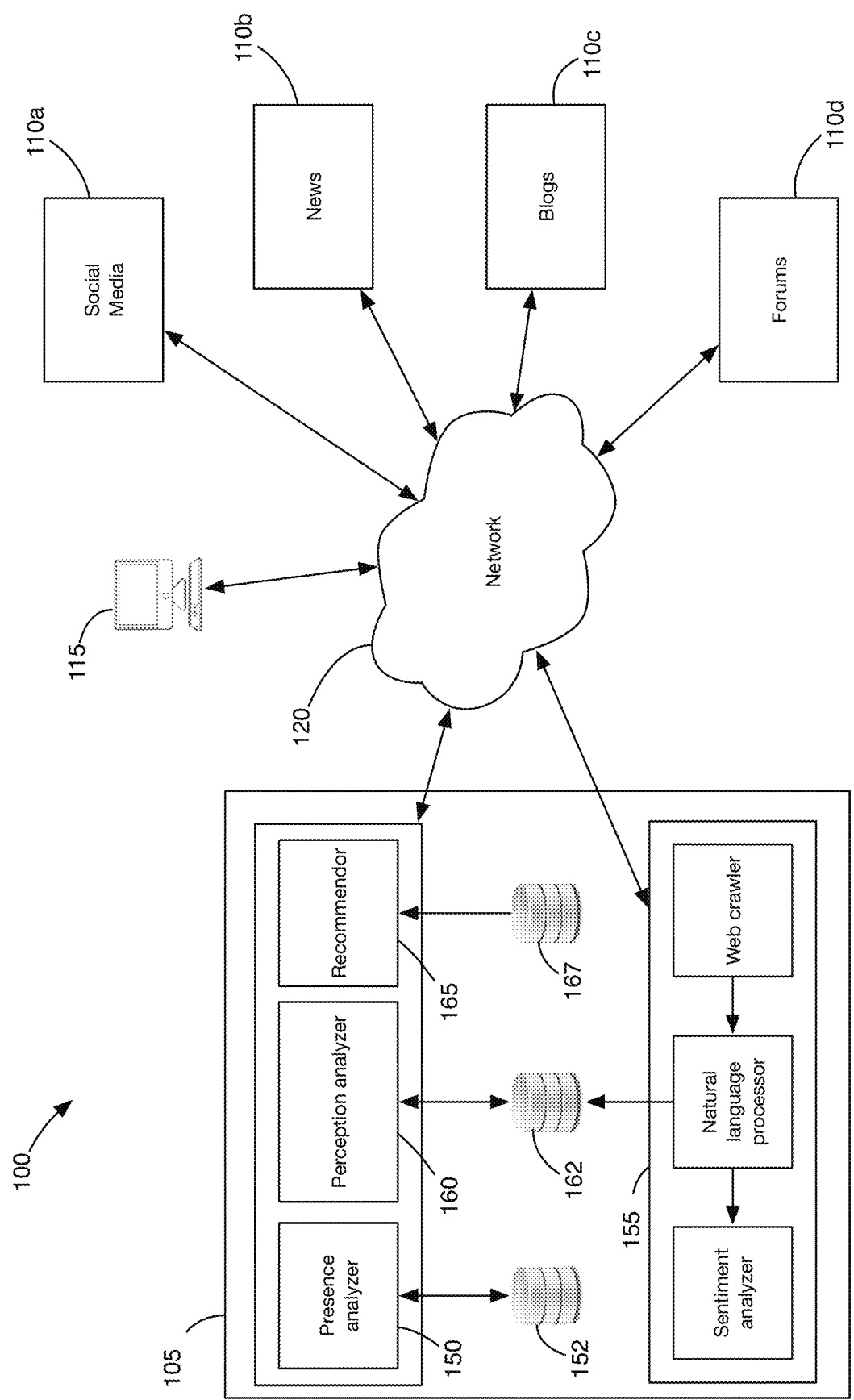
FIG. 1 illustrates an exemplary environment 100 in which a system 100 for assessing and improving a presence and perception of an entity may operate.

FIG. 1 illustrates an exemplary environment 100 in which a system 100 for assessing and improving a presence and perception of an entity may operate. Illustrated are a presence and perception analysis system (PPAS) 105, a group of data sources 110a-110d, and a terminal 115. As illustrated, the various components of the environment 100 may communicate with one another via a network 120 such as the Internet.

As used herein, the term entity generally refers to a company, business, institution, agency, etc., of some kind. A target entity refers to a company or business utilizing the PPAS 105 for which presence and perception information was determined and for which one or more recommendations for improving the same are generated. The term presence corresponds to a measure of the availability of the target entity to a population of potential consumers of products and/or services provided by the target entity. The term perception corresponds to a measure of the sentiment towards the target entity by the potential consumers.

The various data sources 110a-110d correspond generally to computer systems hosting publically available information. For example, the data sources 110a-110d may include social media sources 110 such as Facebook, Twitter, crowd sourced review web sites, etc. The data sources 110a-110d may include news sources 110b such as newspaper websites, news feeds, etc. The data sources 110a-110d may include blogs 110c, forums 110d, and/or any other systems or websites from which information related to an entity may be obtained.

The PPAS 105 includes a presence analyzer subsystem (PSAS) 150, a perception analyzer subsystem (PCAS) 160, a recommendation subsystem (RS) 165, and a social media analytics subsystem (SMAS) 155.

Each subsystem may correspond to a separate computer system, in which case the separate computer systems may communicate with one another via the illustrated network 120 or a different network. In addition, or alternatively, one or more of the subsystems may be implemented by one or more hardware and/or logic processors or modules implemented within the same computer system.

In operation, a user affiliated with a target entity may register with the PPAS 105 to view various dashboards generated by the PPAS 105 for displaying the presence and perception metrics associated with the target entity via the terminal 115. The dashboards are illustrated in FIGS. 5-9.

Prior to generation of the dashboards, the PPAS 105 performs various operations for generating the presence and perception metrics and other information provided on the dashboards. These operations are described in FIGS. 2 and 3. In this regard, the various subsystems of the PPAS 105 may include non-transitory memory that includes instruction code for causing one or more processors of the various subsystems to perform the operations.

Figure 2:
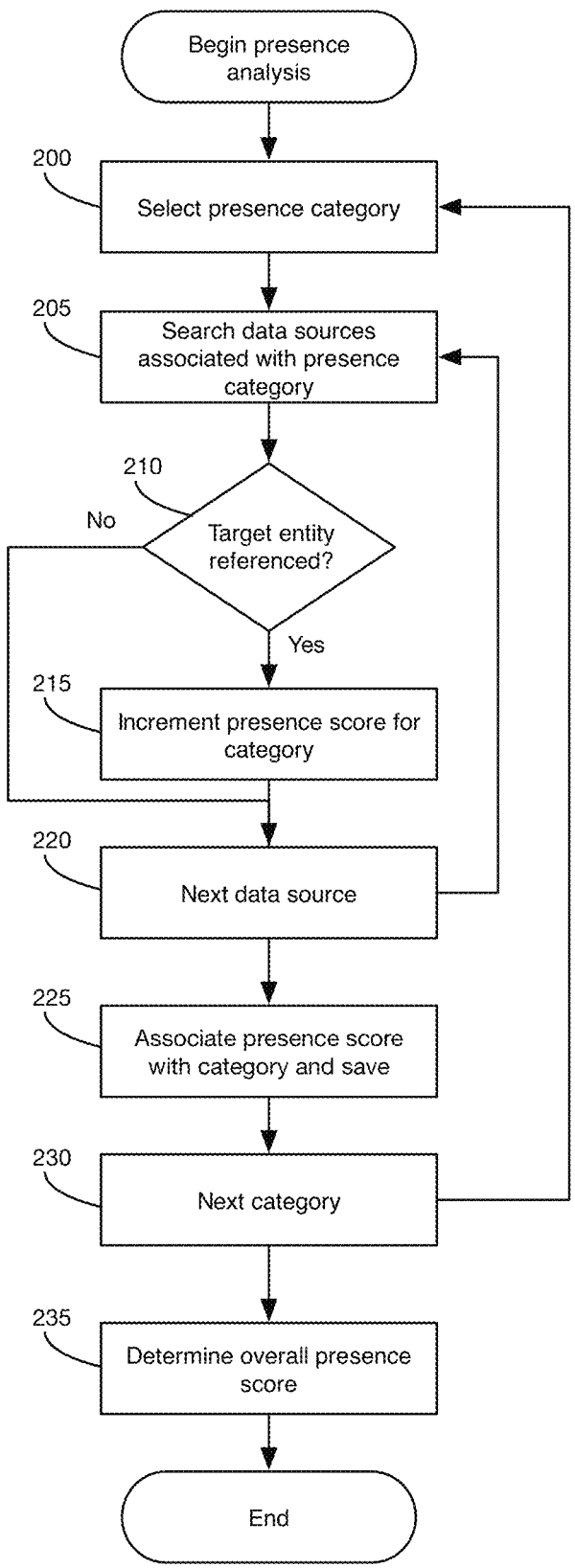
FIG. 2 illustrates exemplary operations that may be performed by a presence analyzer subsystem (PSAS) of a presence and perception analysis system of the exemplary environment.

FIG. 2 describes exemplary operations for determining a presence score for a target entity. Referring to FIG. 2, at block 200 a presence category may be selected and at block 205, data sources associated with the presence category may be searched. For example, a database 152 (FIG. 1) that relates presence categories to data sources may be accessed. Exemplary records that may be stored in the database 152 are listed in Table 1 below.

TABLE 1

| Presence Category | Data sources |
| --- | --- |
| Channels of Engagement | Entity Website, Google Play Store ®, Apple App Store ®, information aggregation sites, etc. |
| Member profiles | Entity Website, Google Play Store ®, Apple App Store ®, etc. |
| Social Networks | Facebook, Twitter, LinkedIn, etc. |
| Online Information | Google ®, Bing ®, Yahoo ®, other search engines, etc. |
| Credit Rating | Experian, TransUnion, etc. |

As illustrated, exemplary categories, such as a channels of engagement category, member profiles category, etc. may be related to data sources such as the entity's website, Google Play Store®, Apple App Store®, etc.

Channels of engagement correspond to an entity's website, mobile app, email, IVRS, etc., which may be relevant to a target entity's presence because they provide different channels through which consumers may connect with the entity. Member profiles correspond to member personalization on an entity's website and mobile app (if available), which may be relevant to a target entity's presence because they allow users of the entity to login into their account and have a personalized view of benefits available to them. Social Networks correspond to a presence on different social media platforms like Facebook®, Twitter®, LinkedIn®, etc., which may be relevant to a target entity's presence because they provide platforms through which information may be disseminated to their respective target consumers where they are most active. Online Information may correspond to an amount of information available about an entity on search engines like Google®, Bing®, Yahoo®, etc., which may be relevant to a target entity's presence because people in general look for information about an entity on these search engines, hence the more there is relevant information available a target entity on such search engines, the higher the presence of the entity. Credit ratings correspond to ratings of an entity provided by global rating agencies, which may be relevant to a target entity's presence because the public availability of a target entity's rating may help consumers to understand an entity's financial performance.

For each category, the PSAS 150 may establish a connection with related data sources to obtain relevant information related to the target entity. For example, the data sources may be web scraped to obtain information. APIs of the data source may be utilized to retrieve information or the data may be retrieved via a different mechanism.

At block 210, the PSAS 150 searches a current data source for references to the target entity. For example, the PSAS 150 may search for the name of the target entity, pseudo names of the target entity, or any other identifiers that may be source identifiers for the target entity. If a reference to the target entity is found, then at block 215, a presence score associated with the selected category may be incremented.

At block 220, the next data source for the category may be selected and the operations from block 205 may repeat until all data sources for the category have been searched.

After all the data sources for the category have been searched, at block 225, the total presence score associated with the category may be stored and associated with the target entity. For example, if all the data sources for a searched reference contain a reference to the target entity, a score of 100% may be saved. If half of the data sources reference the target entity, a score of 50% may be saved, and so on. A different numerical representation may be utilized to indicate the number of data sources that reference the target entity. Other information stored may be a timestamp for when the search was performed.

At block 230, the next category may be selected and the operations from block 200 may repeat until the data sources for all the categories have been searched.

At block 235, an overall presence score may be determined based on the presence scores associated with the different categories. In this regard, the presence scores for the different categories may be weighted differently such that the overall presence score corresponds to a weighted average of the individual presence scores. For example, the overall presence score may be computed as follows:

$$\text{Overall Presence Score} = \frac{\sum_{n=1}^{N} W_n \cdot S_n}{N}$$

Where N is the number of presence categories, $S_n$ is the presence score for category n, and $W_n$ is the weight assigned to presence score for category n.

Figure 3:
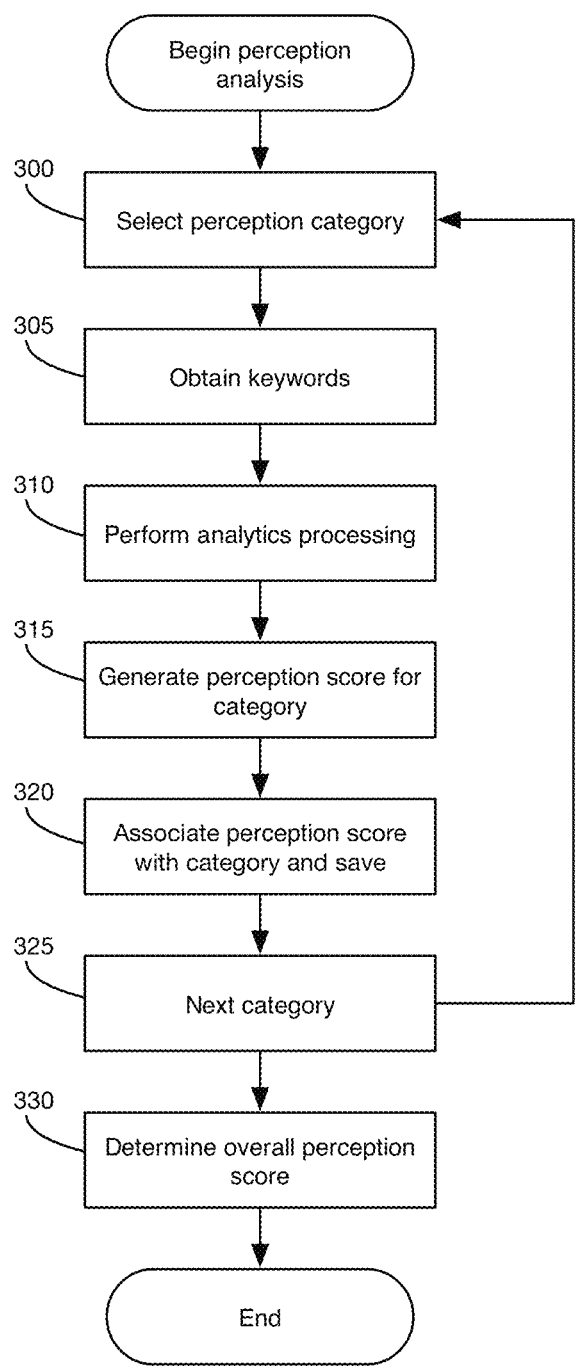
FIG. 3 illustrates exemplary operations that may be performed by a perception analyzer subsystem (PCAS) of the presence and perception analysis system of the exemplary environment.

FIG. 3 describes exemplary operations for determining a perception score for a target entity. Referring to FIG. 3, at block 300, a perception category may be selected and at block 305, keywords associated with the perception category may be obtained. For example, a database 162 that relates perception categories to keywords may have been previously provided.

In some implementations, the categories and associated keywords in the database 163 may be industry specific. For example, for entities that offer pension related services, exemplary records that may be stored in the database 162 are listed in Table 2 below.

TABLE 2

| Perception Category | Keywords |
| --- | --- |
| Benefits | Satisfaction, Advantage, Comfort, Ease, Convenience, etc. |

TABLE 2-continued

| Perception Category | Keywords |
| --- | --- |
| Customer Service | Turn Around Time, Process Efficiency, Resolution Time, Personnel, Assistants, etc. |
| Plans | Schemes, Proposal, Project, Idea, etc. |
| Risks | Uncertainty, Instability, Insecurity, Gamble, Loss, etc. |
| Safety | Welfare, Well-being, Security, Safety, etc. |

As illustrated, exemplary categories, such as a benefits category, customer service category, etc. may be related to keywords such as satisfaction, advantage, comfort, ease, convenience and turnaround time, process efficiency, resolution time, personnel, assistants, respectively.

Benefits correspond to opinions of people on the web related to the benefits provided by the entity, which may be relevant to a target entity's perception because it indicates to the entity how people perceive the benefits provided by the entity. Customer service corresponds to customer support provided by the entity, which may be relevant to a target entity's perception because it indicates to the entity how people perceive the customer service provided by the entity. Plans correspond to the schemes provided by the entity, which may be relevant to a target entity's perception because it indicates to the entity how people perceive the different plans provided by the entity. Risks correspond to the risks associated in engaging with the entity, which may be relevant to a target entity's perception because it indicates to the entity how people perceive the risks in associating with the entity. Safety corresponds to the security associated in engaging with the entity, which may be relevant to a target entity's perception because it indicates to the entity how people perceive the safety in associating with the entity.

The categories and associated keywords selected for a particular type of entity may be generated using predictive models that take actual posts as input to the model to produce an industry specific dictionary of categories and keywords. Use of industry specific dictionary facilitates improved accuracy in assessing the presence associated with a given entity.

For each category, the PCAS 160 may obtain the related keywords at block 305 and communicate the keywords to the SMAS 155. The PCAS 160 may also indicate to the SMAS 155 the name of the target entity, pseudo names of the target entity, or any other identifiers that may be source identifiers for the target entity.

At block 310, the SMAS 155 may search various social media websites to locate comments posted by users that are related to the target entity identifier that includes one or more of the keywords. The social media websites may correspond to the same social media websites used by the PCAS 150 or to one or more other social media websites. The SMAS 155 utilizes a web crawling engine and natural language processing techniques to locate comments. In this regard, the SMAS 155 may utilize support vector machine techniques, conditional random fields, and/or Naïve Bayes techniques in performing the native language processing. Other techniques may be utilized.

When a matching comment is found, the SMAS 155 attempts to determine sentiment attributes such as whether the comment corresponds to a positive comment, negative comment, or neutral/mixed comment about the target entity. Other attributes to be determined may include the gender of the person who posted the comment, the geographic location of the person, and/or a time when the comment was posted.

The SMAS 155 may generate a database record to relate the various attributes with the perception category and store the record in the database 162. Exemplary records that may be stored in the database 162 are listed in Table 3 below.

TABLE 3

| Perception type | Sentiment | Gender | Timestamp | Location |
|---|---|---|---|---|
| Benefit | +1 | M | Jan 5, 2016 | New York |
| Benefit | 0 | F | Jan 5, 2016 | Chicago |
| Benefit | −1 | Unknown | Feb 2, 2016 | Unknown |

Referring to the Table 3, a perception type column indicates the category associated with the record. A sentiment column indicates the sentiment of the person associated with the comment. For example, +1 may indicate a positive comment, −1 may indicate a negative comment, 0 may indicate a neutral/mixed comment. A gender column indicates the gender of the person who posted the comment if the SMAS 155 is able to determine the gender. Similarly, timestamp and location columns indicate the time when the comment was posted and the geographic location from where the comment was sent, respectively, if respective attributes were able to be determined by the SMAS 155. In cases, where the SMAS 155 is unable to determine a particular attribute, the corresponding element in the record may be set to a value such as "unknown" to indicate this fact.

After the SMAS 155 has searched the various social media websites for the category keywords, at block 315, a perception score for the category may be generated. For example, the PCAS 160 may select all the records associated with the category benefit from the database 162. The PCAS 160 may then determine the average sentiment score for the selected records and normalize the score. For example, a normalized sentiment score of 100% for the Benefits category may indicate that 100% of the comments found that were related to the benefit keywords were positive comments of the target entity with respect to benefits. A normalized score of 0 may indicate a neutral view and a normalized score of −100% may indicate that 100% of the comments found were negative comments.

After the normalized score is determined, at block 320, the PCAS 160 may generate a record in the database 162 to relate the normalized score with the category. In some implementations, the time at which the analysis is run may be stored in the record to facilitate observing changes in sentiment over time. An exemplary set of records is illustrated below in Table 4.

TABLE 4

| Perception type | Normalized score | Timestamp |
|---|---|---|
| Benefit | 27% | Jan 5, 2016 |
| Customer Service | −100% | Jan 5, 2016 |
| Plans | −27% | Jan 5, 2016 |
| Risks | −14% | Jan 5, 2016 |
| Safety | −60% | Jan 5, 2016 |
| Benefit | 40% | Jan 10, 2016 |
| Customer Service | −80% | Jan 10, 2016 |
| Plans | −10% | Jan 10, 2016 |
| Risks | −7% | Jan 10, 2016 |
| Safety | −30% | Jan 10, 2016 |
| ... | | |

At block 325, the next category may be selected and the operations from block 300 may repeat until the data sources for all the categories have been searched.

At block 330, an overall perception score may be determined based on the perception scores associated with the different categories. In this regard, the perception scores for the different categories may be weighted differently such that the overall perception score corresponds to a weighted average of the individual perception scores. For example, the overall perception score may be computed as follows:

$$\text{Overall perception Score} = \frac{\sum_{n=1}^{N} W_n \cdot S_n}{N}$$

Where N is the number of perception categories, $S_n$ is the perception score for category n, and $W_n$ is the weight assigned to perception score for category n.

Subsequent to determining the overall presence score at block 235 and the overall perception score at block 330, the PPAS 105 may determine an overall score for the target entity, the overall score may correspond to a weighted average of the presence score and perception score. For example, the overall score may be computed as follows:

$$\text{Overall Score} = \frac{W_{PSS} \cdot S_{PSS} + W_{PCS} \cdot S_{PCS}}{2}$$

Where $W_{PSS}$ and $W_{PCS}$ correspond respectively to the weight for the presence and perception scores, and $S_{PSS}$ and $S_{PCS}$ correspond respectively to the overall presence and perception scores determined earlier.

As noted above, the PPAS 105 generates various dashboards to convey the information determined above to a user. In this regard, the PPAS 105 may include a web server configured to generate and communicate the dashboards to the terminal 115.

Figure 4:
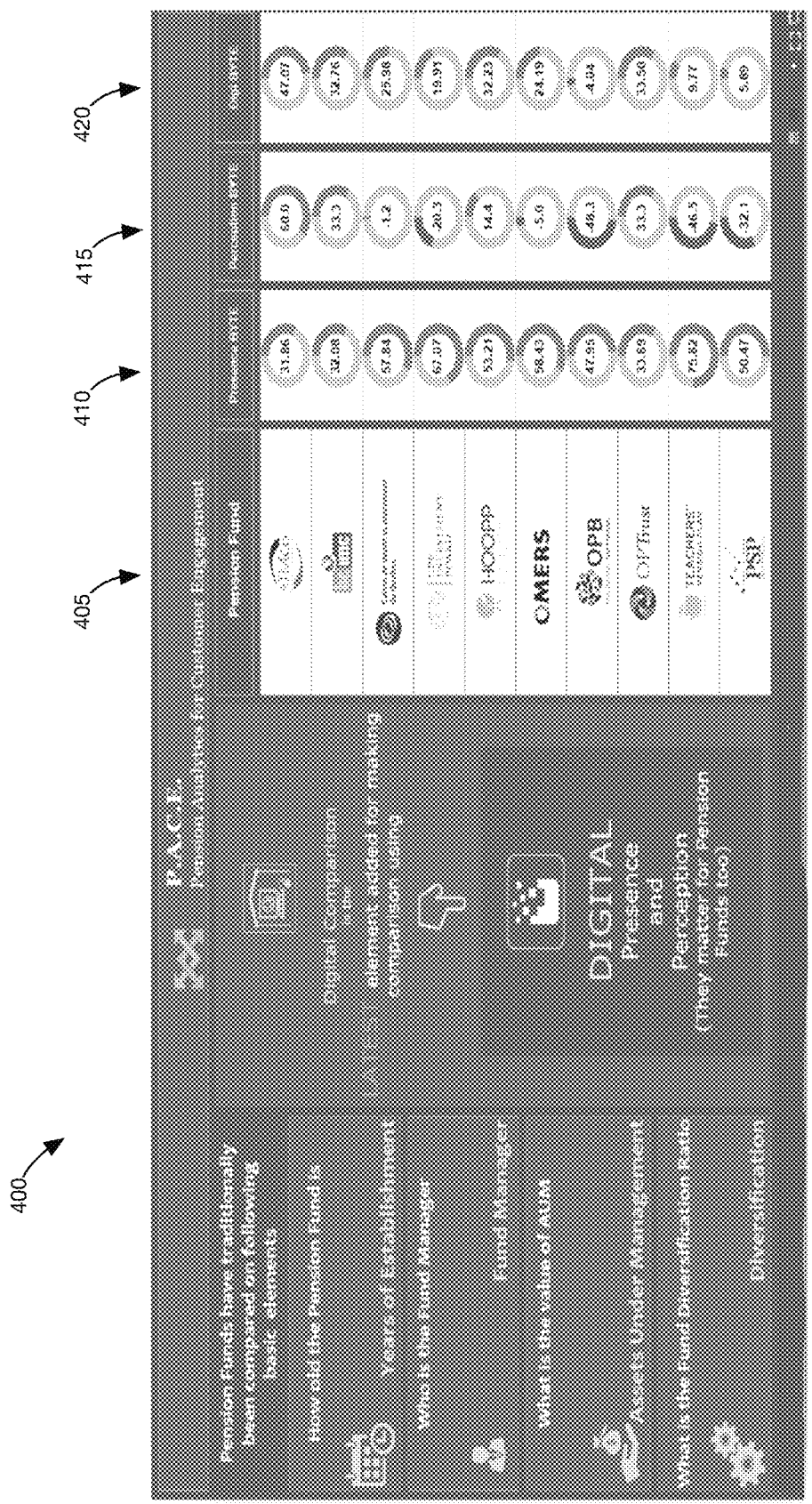
FIG. 4 illustrates a first exemplary dashboard that lists target entities for which the operations described in FIGS. 2 and 3 may be performed.

FIG. 4 illustrates a first dashboard 400 that may be communicated to the terminal 115. The first dashboard 400 includes a list of target entities 405 for which the analysis described above may have been performed, along with the corresponding overall presence score determined at block 235, overall perception score determined at block 330, and the overall score 420 determined above. The respective scores may be conveyed in numeric form, graphical form, or a combination of both, as illustrated.

The target entities 405 in the first dashboard 400 correspond to pension funds, which are sorted based on the overall score 420. This facilitates determining at a glance how the various pension funds compare to one another. While the entities listed correspond to pension funds, it should be understood that the entities may be different. For example, the entities may correspond to banks, consumer product manufacturers, auto manufactures, etc. In addition, the target entities 410 may be from the same industry or different industries.

Figure 5:
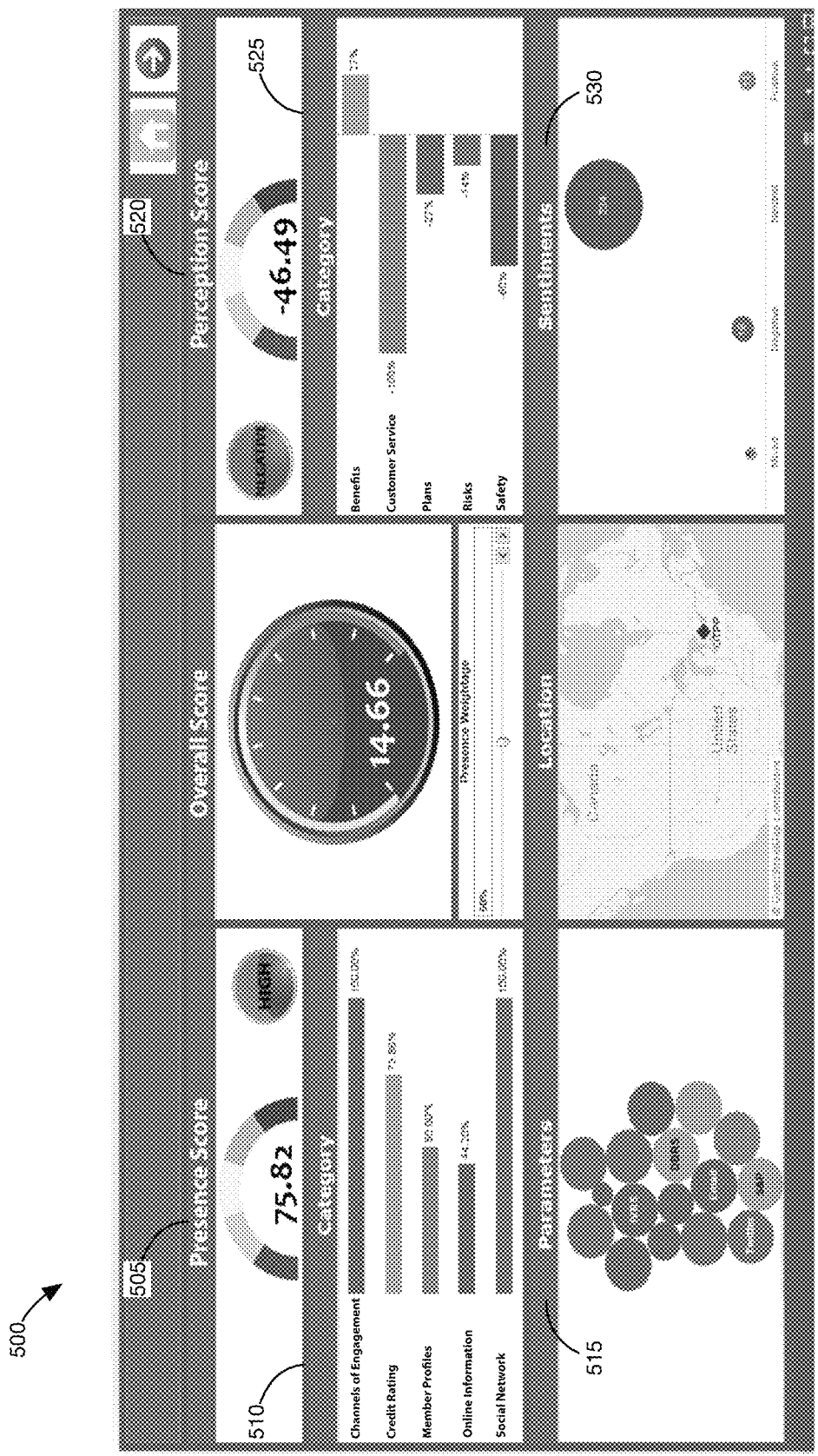
FIG. 5 illustrates a second exemplary dashboard that provides a more in depth view of details associated with the analysis performed on a given target entity.

FIG. 5 illustrates a second exemplary dashboard 500 that provides a more in depth view of details associated with the analysis performed on a given target entity. In some implementations, selecting/clicking on a target entity in the target entity list 410 of the first dashboard 400 may cause the second dashboard 500 to be displayed.

The second dashboard 500 includes a presence score element 505 for conveying the overall presence score associated with the selected target entity. A presence category list 510 is provided and lists the various categories assessed in determining the overall presence score such a channels of engagement category, member profiles category, etc. The presence score associated with a given category, which is determined at block 225, is listed next to the category.

In some implementations, selecting a category in the presence category list 510 causes the data sources associated with the selected presence category to be displayed in a parameter window 515. Bubbles, in one embodiment, may be utilized to represent each data source, as illustrated. The size of the bubble for a given data source may be proportional to the number of references to the target entity obtained from the data source. Other embodiments, may use other icons, symbols, numbers, etc., to represent data sources.

Also included on the second dashboard 500 is a perception score element 520 for conveying the overall perception score associated with the selected target entity. A perception category list 525 is provided and lists the various categories assessed in determining the overall perception score such a benefits, customer service, etc. The perception score associated with a given category, which is determined at block 315, is listed next to the category.

In some implementations, selecting a category in the perception category list 525 causes the sentiment breakdown associated with the selected perception category to be displayed in a sentiments window 530. Bubbles may be utilized to represent the number of comments that were positive, negative, mixed, or neutral. For example, the illustrated sentiments window 530 indicates that the selected perception category received 5 mixed comments, 19 negative comments, 234 neutral comments, and 11 positive comments.

Figure 6:
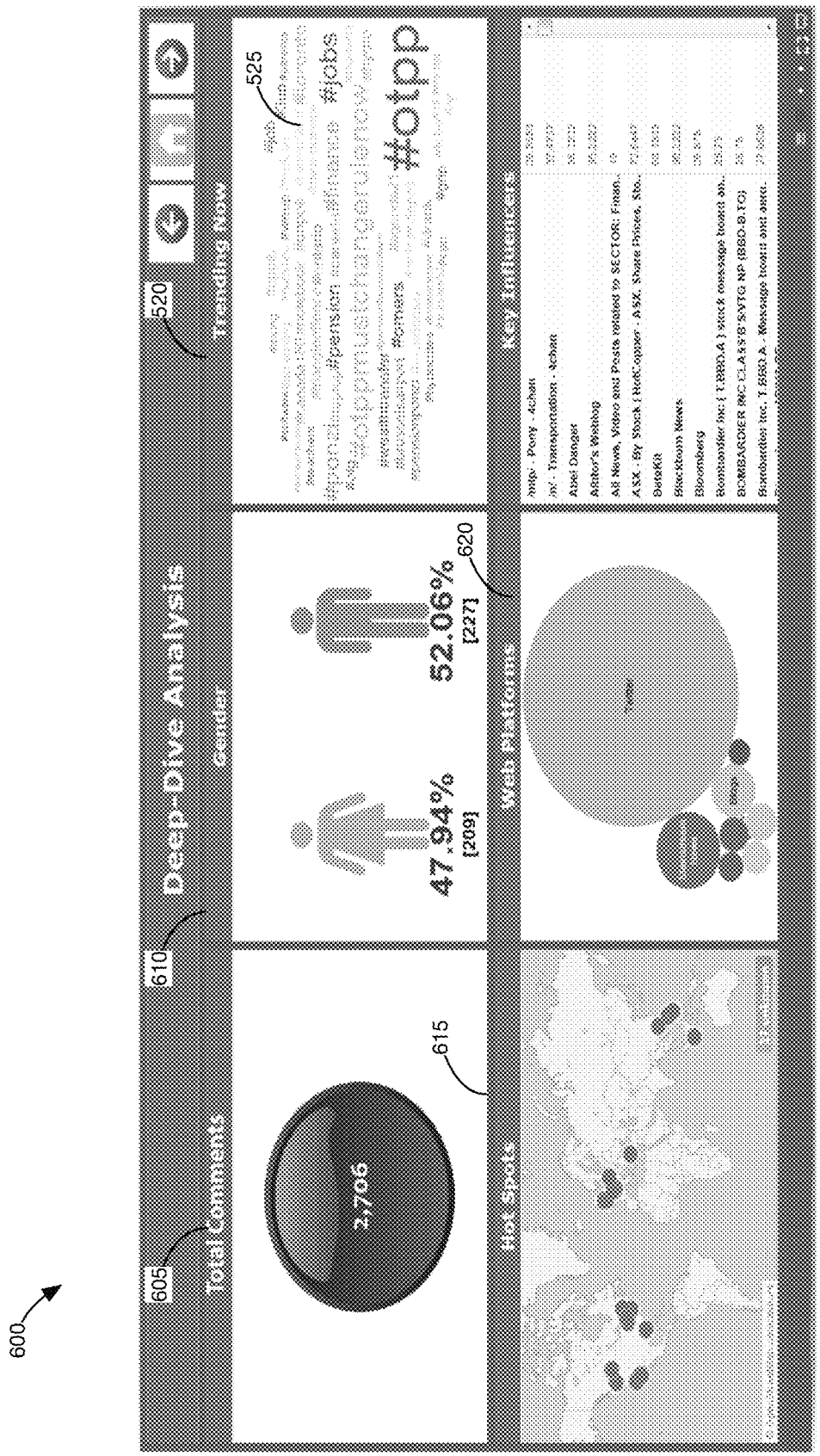
FIG. 6 illustrates a third exemplary dashboard that provides additional information related to the analysis performed on the target entity.

FIG. 6 illustrates a third exemplary dashboard 600 that provides additional information related to the analysis performed above with respect to the target entity. For example, a total comments window 605 indicates the total number of comments located on the social media sources searched by the SMAS 155 that were related to the target entity. A gender window 610 indicates the percentage of males and females associated the comments. A hot spots window 615 indicates the locations where the comments originated. A web platforms window 615 indicates the social media platforms from where the comments originated. Each web platform may be represented by a bubble with a diameter that is proportional to the number of comments received from the web platform.

The information conveyed above helps the user better understand those individuals that are providing comments. For example, knowledge that a high number of comments are originating in, for example, New York city by females indicates to that females in New York city have an interest of some kind, good, bad, or neutral, in the target entity. This allows the user to understand which categories need improvement.

The information above may be associated with all the perception categories. In some implementations, the information may be related to a specific perception category. For example, a user may select one of the perception categories for further analysis. The information in the respective windows may be related to the selected perception category (e.g., the benefits perception category). This further enhances the user's ability to determine details related to the specific category about which there is interest in a certain population.

Other information that may be included on the third exemplary dashboard 600. For example, in some implementations information related to comments found on Twitter® may be displayed, such as a list of hash tags under which the target entity was mentioned that are trending (i.e., hash tags that are popular). In addition, the key influencers that are using the hash tags may be displayed.

Figure 7:
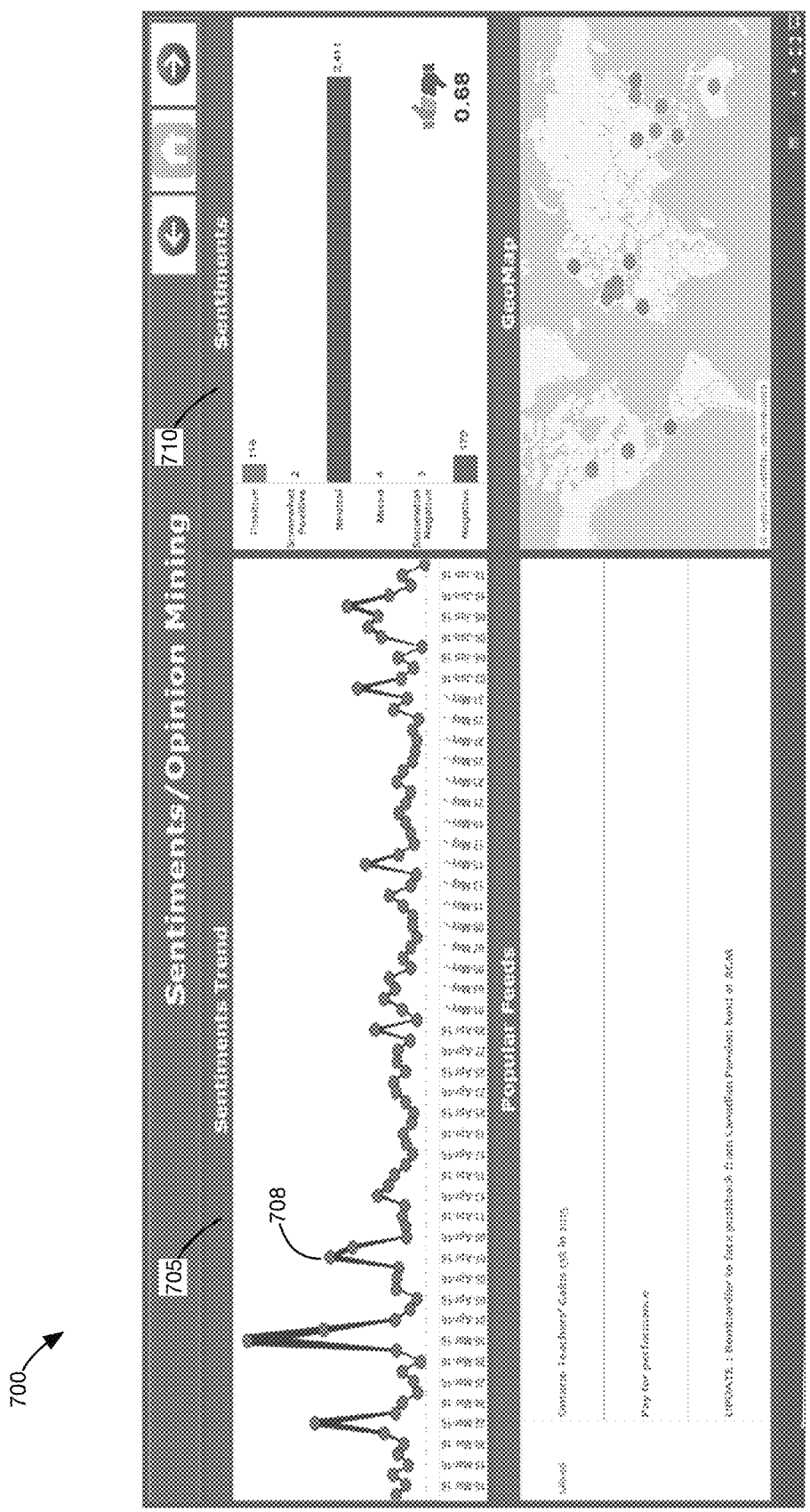
FIG. 7 illustrates a fourth exemplary dashboard that facilitates viewing the perception score associated with a target entity over time.

FIG. 7 illustrates a fourth exemplary dashboard 700 that facilitates viewing the perception score associated with a target entity over time. The fourth dashboard 700 includes a sentiment trend window 705 that display a timeline of perception scores. In some implementations, selecting a point 708 on the timeline causes a sentiment window 710 on the dashboard 700 to display the number of positive, neutral, negative, etc. comments associated with the overall perception score for the day associated with the selected point 708. In yet other implementations, a particular day may be selected and the corresponding detailed information related to that day may be displayed in the second and third exemplary dashboards 500 and 600. For example, the perception may be particularly low on a given day. Selecting this day may cause the second and third exemplary dashboards 500 and 600 to display the detailed perception score associated with the different perception categories. This allows the user to determine whether a particular category was causing the negative perception, which in turn allows the user to take appropriate action to remedy the issue causing the negative perception.

Figure 8:
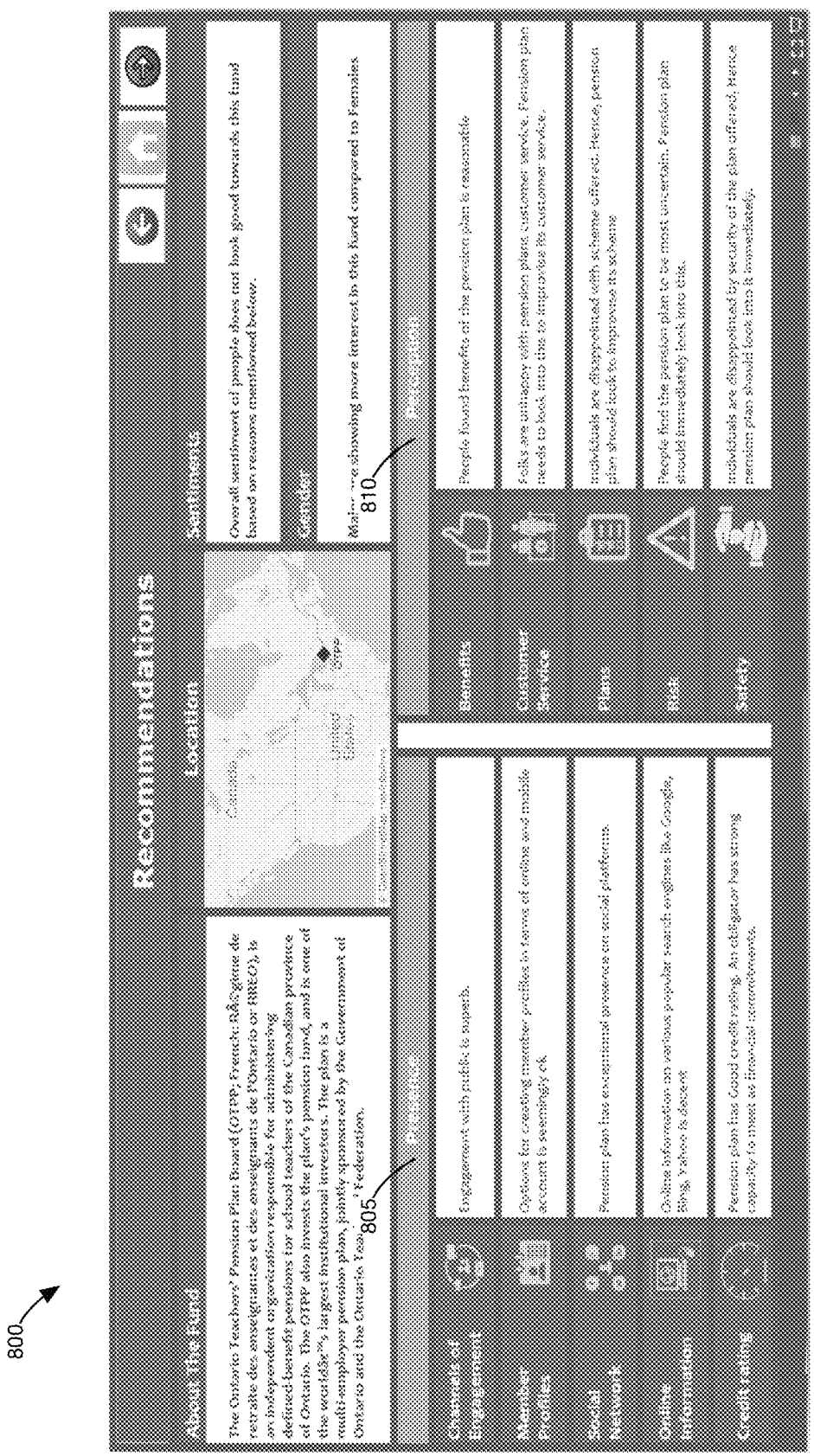
FIG. 8 illustrates a fifth exemplary dashboard that facilitates viewing recommendations for improving presence and perception scores associated with different presence and perception categories.

FIG. 8 illustrates a fifth exemplary dashboard 800 that facilitates viewing recommendations for improving presence and perception scores associated with the different presence and perception categories. The fifth dashboard 800 includes a presence recommendation window 805 and a perception recommendation window 810. Each window provides recommendations for each category of the corresponding window. The recommendations may have been previously generated and mapped to the scores associated with categories and stored to a database 167. In this regard, predictive models and analytics that employ artificial intelligence techniques may be used to generate the recommendations. The recommendations may be tailored to a specific industry or company. Table 6 illustrates exemplary recommendation mappings for the channels of engagement and member profiles of the presence categories.

TABLE 6

| Channels of Engagement | |
|---|---|
| Number of social media sources on which target entity is referenced | Recommendation |
| 0%-20% | The options for interactions are very few. Corrective measures are required. |
| 21%-40% | The options for interactions are few. Additional channels of engagement are recommended. |
| . . . | |
| 81%-100% | Multiple channels for interactions are available. |

| Member profiles | |
|---|---|
| Number of social media sources on which entity has a presence | Recommendation |
| 0%-20% | Number of options for creating member profiles are inadequate. More online sources must be explored. |
| 21%-40% | Options for creating member profiles in terms of online and mobile account can be explored. |
| . . . | |
| 81%-100% | The plans offer the right level of options for creating member profiles in terms of online and mobile account. |

Recommendations for the other presence categories may also be provided.

Tables 7 illustrates exemplary recommendation mappings for perception categories.

TABLE 7

| Average Sentiment | Recommendation |
|---|---|
| Benefits | |
| −100%-0% | The benefits of the pension plan are not well received by prospects. |
| −1%-20% | The benefit of pension plan is not well comprehensible to prospects or compares unfavorably with similar competitor planes in the market. |
| ... | |
| 61%-100% | The plans are well received and customers voiced their support in the social media. |
| Customer Service | |
| −100%-0% | There is negative perception in terms of customer engagement and service of existing customers. |
| −1%-20% | Customers have expressed sentiments that suggest room for improvement in customer services as essential |
| ... | |
| 61%-100% | Customer service is rated very high and the company enjoys positive perception in market. |

Recommendations for the other perception categories may also be provided.

The recommendations shown to the user via the fifth exemplary dashboard 800 allow the user to take necessary action for improving a given presence category and perception category. In some implementations, the recommendations provided are based actions taken by other entities to improve performance in a particular category.

Figure 9:
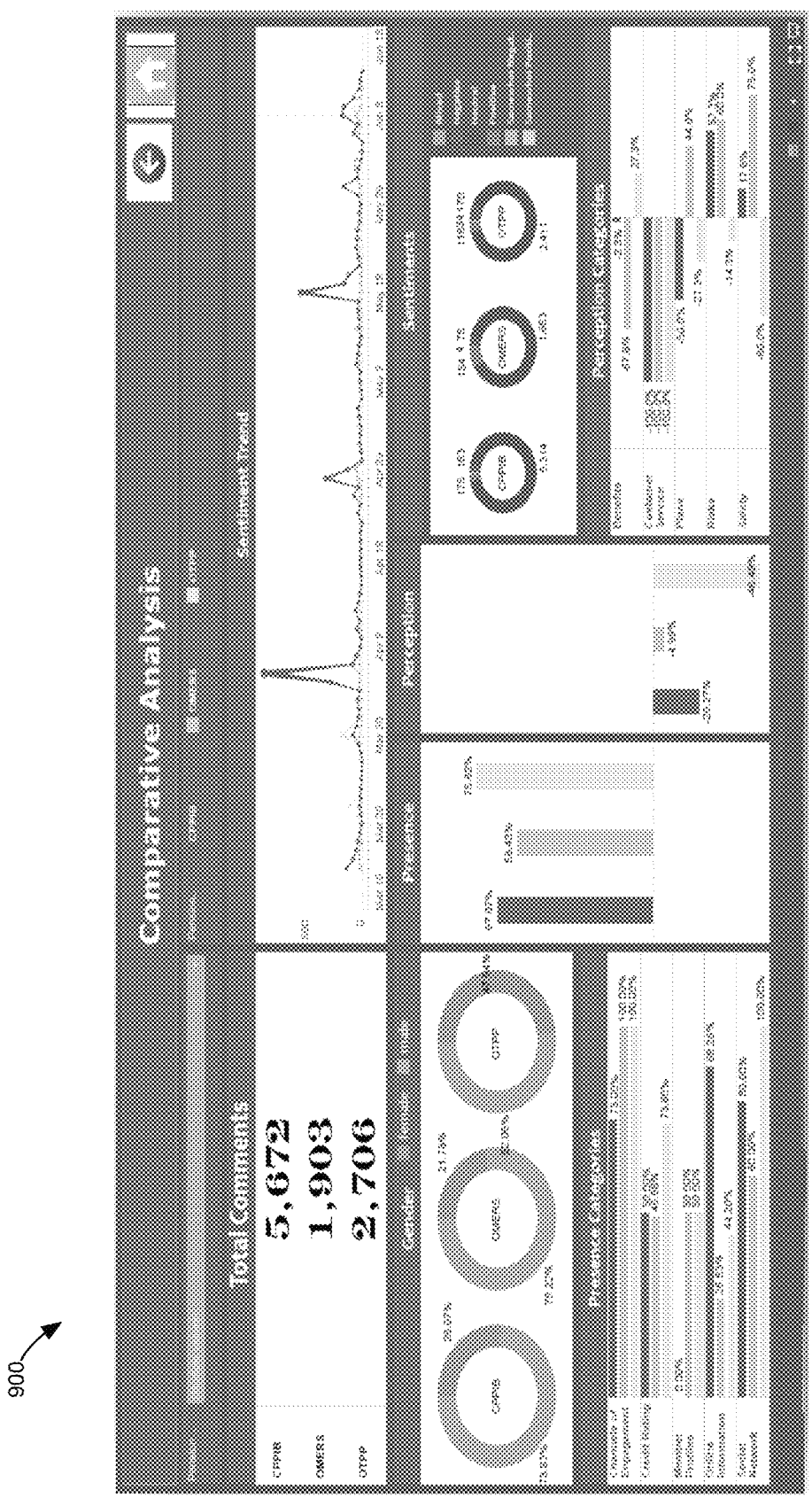
FIG. 9 illustrates a sixth exemplary dashboard that facilitates viewing a detailed comparative analysis of a group of entities.

FIG. 9 illustrates a sixth exemplary dashboard 900 that facilitates viewing a detailed comparative analysis of a group of entities. For example, the number of comments, sentiment trends, gender, and scores associated with the various presence and perception categories for a group on entities may be displayed. This allows the user to quickly assess differences between a target entity and competing entities to determine how the target entity compares.

Figure 10:
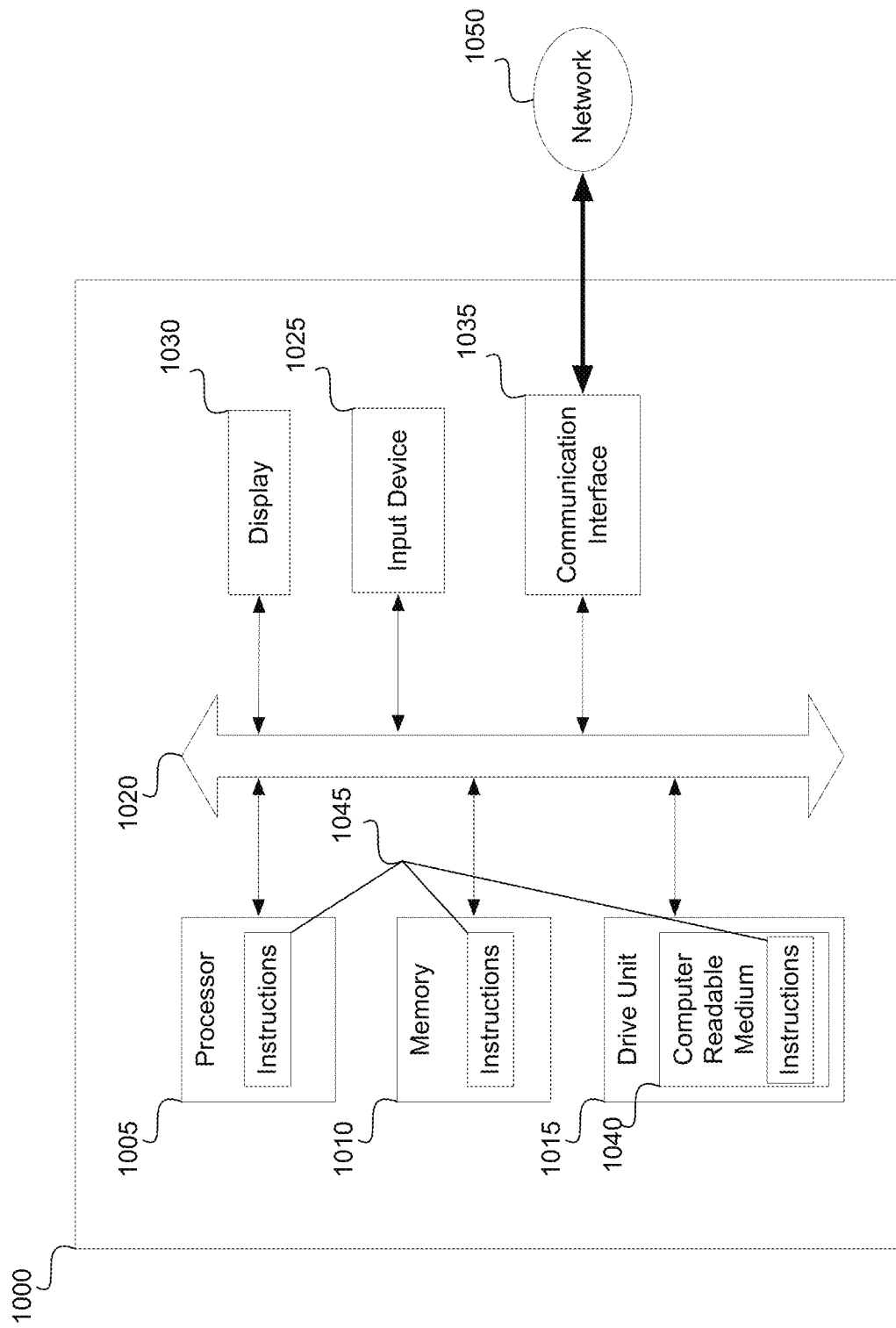
FIG. 10 illustrates an exemplary computer system that may form part of or implement the systems described in the figures or in the following paragraphs.

FIG. 10 illustrates a computer system 1000 that may form part of or implement the systems described above. The computer system 1000 may include a set of instructions 1045 that the processor 1005 may execute to cause the computer system 1000 to perform any of the operations described above. The computer system 1000 may operate as a stand-alone device or may be connected, e.g., using a network, to other computer systems or peripheral devices.

In a networked deployment, the computer system 1000 may operate in the capacity of a server or as a client-user computer in a server-client user network environment, or as a peer computer system in a peer-to-peer (or distributed) network environment. The computer system 1000 may also be implemented as or incorporated into various devices, such as a personal computer or a mobile device, capable of executing the instructions 1045 (sequential or otherwise) that specify actions to be taken by that machine. Further, each of the systems described may include any collection of sub-systems that individually or jointly execute a set, or multiple sets, of instructions to perform one or more computer functions.

The computer system 1000 may include one or more memory devices 1010 on a bus 1020 for communicating information. In addition, code operable to cause the computer system to perform any of the operations described above may be stored in the memory 1010. The memory 1010 may be a random-access memory, read-only memory, programmable memory, hard disk drive or any other type of memory or storage device.

The computer system 1000 may include a display 1030, such as a liquid crystal display (LCD), a cathode ray tube (CRT), or any other display suitable for conveying information. The display 1030 may act as an interface for the user to see the functioning of the processor 1005, or specifically as an interface with the software stored in the memory 1010 or in the drive unit 1015.

Additionally, the computer system 1000 may include an input device 1025, such as a keyboard or mouse, configured to allow a user to interact with any of the components of system 1000.

The computer system 1000 may also include a disk or optical drive unit 1015. The disk drive unit 1015 may include a computer-readable medium 1040 in which the instructions 1045 may be stored. The instructions 1045 may reside completely, or at least partially, within the memory 1010 and/or within the processor 1005 during execution by the computer system 1000. The memory 1010 and the processor 1005 also may include computer-readable media as discussed above.

The computer system 1000 may include a communication interface 1035 to support communications via a network 1050. The network 1050 may include wired networks, wireless networks, or combinations thereof. The communication interface 1035 network may enable communications via any number of communication standards, such as 802.11, 802.12, 802.20, WiMAX, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While methods and systems have been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present methods and systems not be limited to the particular embodiment disclosed, but that the disclosed methods and systems include all embodiments falling within the scope of the appended claims.

We claim:

1. A method for assessing and improving a presence and perception of an entity, the method comprising:

for one or more presence categories of data sources, determining a number of data sources in a presence category on which the entity has a presence, the data sources including data;

determining a presence score for the entity based on the data, wherein the presence score increases as the number of data sources upon which the entity has a presence increases;

for each of a plurality of comments posted on one or more social media sources, determining a perception category and a sentiment score associated with each comment that is related to the entity; where:

each perception category is associated with a group of keywords;

for each perception category, the group of keywords and one or more identifiers for the entity is communicated to a social media analytics subsystem (SMAS);

the SMAS searching the one or more social media sources to locate comments associated with the entity; and the SMAS determining the sentiment score for each located comment and generating a record in a database that relates the sentiment score to the perception category;

for each of a plurality of comments, determining a perception score for the entity based on the determined perception category and sentiment score, wherein a higher perception score indicates that, on average, users have a higher perception of the entity;

determining an overall perception score for the entity based on the perception scores determined for the plurality of comments;

providing, for display via a first dashboard, a perception score element conveying the overall perception score for the entity, and a perception category list that:

lists the perception categories assessed in determining the overall perception score; and identifies a perception score associated with each of the listed perception categories;

providing, for display via a second dashboard, a sentiment trend window that displays a timeline of previously determined overall perception scores, where:

the sentiment trend window includes a plurality of selectable elements associated with particular times at which overall perception scores of the entity were previously determined; and the second dashboard further including a sentiment window that displays sentiment attributes associated with a selected overall perception score;

simultaneously updating, based upon user selection of a selectable element, the first and the second dashboards, the updating including:

causing the sentiment window in the second dashboard to display sentiment attributes associated with the overall perception score determined at the particular time associated with the selected element, causing the perception score element in the first dashboard to display the overall perception score recorded at the particular time associated with the selected element, and causing the perception category list in the first dashboard to identify perception scores associated with the listed perception categories at the particular time associated with the selected element.

2. The method according to claim 1, wherein determining the presence score for the entity further comprises:

assigning a weight to each of the one or more presence categories; and determining the presence score as the weighted average of the determined number of data sources in the one or more categories.

3. The method according to claim 1, wherein determining the perception score for the entity further comprises:

assigning a weight to each of the one or more perception categories; and determining the perception score as the weighted average of the sentiment scores for each of the perception categories.

4. The method according to claim 1, further comprising:

determining an overall score for the entity as the weighted average of the presence score and the perception score.

5. The method according to claim 1, further comprising:

determining, by the SMAS system, gender information of a commentator associated with the located comment, geographic location information associated with the located comment, and timestamp information associated with the located comment; and storing the gender, geographic location, and timestamp information to the record.

6. The method according to claim 1, wherein generating a recommendation for improving one or more of the presence score and perception score further comprises:

mapping each presence category and each perception category to one or more recommendations;

for each presence category, selecting a mapped recommendation for the presence category based on the number of social media sources in the presence category on which the entity has a presence; and for each perception category, selecting a mapped recommendation for the perception category based on an average sentiment score of comments associated with the perception category.

7. The method according to claim 1, further comprising:

locating, based on the determined presence score and the determined perception score, a recommendation record in a database, the recommendation record defining instructions for improving one or more of the presence score and perception score of the entity;

communicating, via a user interface, the instructions to a user;

receiving, via the user interface, a user selection of a particular perception category for analysis; and communicating, via the user interface, a sentiment breakdown associated with the particular perception category selected for analysis.

8. A system comprising:

a processor; and a non-transitory computer readable medium that includes instruction code, wherein the instruction code includes a presence analysis module, a perception analysis module, and a recommendation module, wherein:

instructions of the presence analysis module are configured to cause the processor to:

determine, for one or more presence categories of data sources, a number of data sources in a presence category on which the entity has a presence; and determine a presence score for the entity, wherein the presence score increases as the number of data sources upon which the entity has a presence increases;

instructions of the perception analysis module are configured to cause the processor to:

determine, for each of a plurality of comments posted on one or more social media sources, a perception category and sentiment score associated with each comment that is related to the entity; where:
  each perception category is associated with a group of keywords;
  for each perception category, the group of keywords and one or more identifiers for the entity is communicated to a social media analytics module of a social media analytics subsystem (SMAS);
  the SMAS searching the one or more social media sources to locate comments associated with the entity; and
  the SMAS determining a sentiment score for each located comment and generating a record in a database that relates the sentiment score to the perception category;
for each of the plurality of comments, determine a perception score for the entity, wherein a higher perception score indicates that, on average, users have a higher perception of the entity; and
instructions of the recommendation module are configured to cause the processor to:
  determine an overall perception score for the entity based on the perception scores determined for the plurality of comments;
  provide, for display via a first dashboard, a perception score element for conveying the overall perception score for the entity, and a perception category list that:
    lists the perception categories assessed in determining the overall perception score; and
    identifies a perception score associated with each of the listed perception categories;
  provide, for display via a second dashboard, a sentiment trend window that displays a timeline of previously determined overall perception scores, where:
    the sentiment trend window includes a plurality of selectable elements associated with particular times at which overall perception scores of the entity were previously determined, and
    the second dashboard further includes a sentiment window that displays sentiment attributes associated with a selected overall perception score;
  simultaneously update, based upon user selection of a selectable element, the first and the second dashboards, the update including:
    causing the sentiment window in the second dashboard to display sentiment attributes associated with the overall perception score determined at the particular time associated with the selected element,
    causing the perception score element in the first dashboard to display the overall perception score recorded at the particular time associated with the selected element, and
    causing the perception category list in the first dashboard to identify perception scores associated with the listed perception categories at the particular time associated with the selected element.

9. The system according to claim 8, wherein in determining the presence score for the entity, the presence analysis module is further configured to cause the processor to:
  assign a weight to each of the one or more presence categories; and
  determine the presence score as the weighted average of the determined number of data sources in the one or more categories.

10. The system according to claim 8, wherein in determining the perception score for the entity, the perception analysis module is further configured to cause the processor to:
  assign a weight to each of the one or more perception categories; and
  determine the perception score as the weighted average of the sentiment scores for each of the perception categories.

11. The system according to claim 8, wherein one of the presence analysis module and the perception analysis module is further configured to cause the processor to:
  determine an overall score for the entity as the weighted average of the presence score and the perception score.

12. The system according to claim 8, wherein the social media analytics module is further configured to cause the processor to:
  determine gender information of a commentator associated with the located comment, geographic location information associated with the located comment, and timestamp information associated with the located comment; and
  store the gender, geographic location, and timestamp information to the record.

13. The system according to claim 8, wherein the recommendation module is further configured to cause the processor to:
  map each presence category and each perception category to one or more recommendations;
  for each presence category, select a mapped recommendation for the presence category based on the number of social media sources in the presence category on which the entity has a presence; and
  for each perception category, select a mapped recommendation for the perception category based on an average sentiment score of comments associated with the perception category.

14. The system according to claim 8, wherein the instruction code further includes a recommendation module, and instructions of the recommendation module are configured to cause the processor to:
  locate, based on the determined presence score and the determined perception score, a recommendation record in a database, the recommendation record defining instructions for improving one or more of the presence score and perception score of the entity;
  communicate, via a user interface, the instructions to a user;
  receive, via the user interface, a user selection of a particular perception category for analysis; and
  communicate, via the user interface, a sentiment breakdown associated with the particular perception category selected for analysis.

15. A non-transitory computer readable medium having instruction code stored thereon for assessing and improving a presence and perception of an entity, the instruction code being executable by a machine for causing the machine to perform acts comprising:
  for one or more presence categories of data sources, determining a number of data sources in a presence category on which the entity has a presence to thereby determine a presence score for the entity, wherein the presence score increases as the number of data sources upon which the entity has a presence increases;

for each of a plurality of comments posted on one or more social media sources, determining a perception category and sentiment score associated with each comment that is related to the entity to thereby determine a perception score for the entity, wherein:
- a higher perception score indicates that, on average, users have a higher perception of the entity;
- each perception category is associated with a group of keywords;
- for each perception category, the group of keywords and one or more identifiers for the entity is communicated to a social media analytics subsystem (SMAS);
  - the SMAS searching the one or more social media sources to locate comments associated with the entity; and
  - the SMAS determining the sentiment score for each located comment and generating a record in a database that relates the sentiment score to the perception category;

for each of the plurality of comments, determining a perception score for the entity based on the determined perception category and sentiment score, wherein a higher perception score indicates that, on average, users have a higher perception of the entity;

determining an overall perception score for the entity based on the perception scores determined for the plurality of comments;

providing, for display via a first dashboard, a perception score element for conveying the overall perception score for the entity, and a perception category list that:
- lists the perception categories assessed in determining the overall perception score;
- identifies a perception score associated with each of the listed perception categories;

providing, for display via a second dashboard, a sentiment trend window that displays a timeline of previously determined overall perception scores, where:
- the sentiment trend window includes a plurality of selectable elements associated with particular times at which overall perception scores of the entity were previously determined; and
- the second dashboard further includes a sentiment window that displays sentiment attributes associated with a selected overall perception score;

simultaneously updating, based upon user selection of a selectable element, the first and the second dashboards, the updating including:
- causing the sentiment window in the second dashboard to display sentiment attributes associated with the overall perception score determined at the particular time associated with the selected element;
- causing the perception score element in the first dashboard to display the overall perception score recorded at the particular time associated with the selected element; and
- causing the perception category list in the first dashboard to identify perception scores associated with the listed perception categories at the particular time associated with the selected element.

16. The non-transitory computer readable medium according to claim 15, wherein in determining the presence score for the entity, the instruction code is further executable by the machine for causing the machine to perform acts comprising:
- assigning a weight to each of the one or more presence categories; and
- determining the presence score as the weighted average of the determined number of data sources in the one or more categories.

17. The non-transitory computer readable medium according to claim 15, wherein in determining the perception score for the entity, the instruction code is further executable by the machine for causing the machine to perform acts comprising:
- assigning a weight to each of the one or more perception categories; and
- determining the perception score as the weighted average of the sentiment scores for each of the perception categories.

18. The non-transitory computer readable medium according to claim 15, wherein the instruction code is further executable by the machine for causing the machine to perform acts comprising:
- determining an overall score for the entity as the weighted average of the presence score and the perception score.

19. The non-transitory computer readable medium according to claim 15, wherein the instruction code is further executable by the machine for causing the machine to perform acts comprising:
- determining gender information of a commentator associated with the located comment, geographic location information associated with the located comment, and timestamp information associated with the located comment; and
- storing the gender, geographic location, and timestamp information to the record.

20. The non-transitory computer readable medium according to claim 15, wherein the instruction code is further executable by the machine for causing the machine to perform acts comprising:
- locating, based on the determined presence score and the determined perception score, a recommendation record in a database, the recommendation record defining instructions for improving one or more of the presence score and perception score of the entity;
- communicating, via a user interface, the instructions to a user;
- receiving, via the user interface, a user selection of a particular perception category for analysis; and
- communicating, via the user interface, a sentiment breakdown associated with the particular perception category selected for analysis.

* * * * *